United States Patent
Sparkman

[11] Patent Number: 5,775,107
[45] Date of Patent: Jul. 7, 1998

[54] SOLAR POWERED ELECTRICAL GENERATING SYSTEM

[76] Inventor: Scott Sparkman, P.O. Box 240471, Honolulu, Hi. 26824-0471

[21] Appl. No.: 734,190

[22] Filed: Oct. 21, 1996

[51] Int. Cl.$^6$ ..................... B60K 16/00
[52] U.S. Cl. ............. 60/641.8; 60/641.1; 60/650; 60/671; 60/682
[58] Field of Search ............. 60/641.8, 641.13, 60/650, 651, 671, 682; 126/609, 610, 586; 237/2 B; 62/238.1, 238.2

[56] References Cited

U.S. PATENT DOCUMENTS

| | | | |
|---|---|---|---|
| 3,675,416 | 7/1972 | Maeda | 60/671 |
| 3,983,704 | 10/1976 | McFarland | 60/641.13 |
| 4,007,776 | 2/1977 | Alkasab | |
| 4,079,591 | 3/1978 | Derby et al. | 60/641.8 |
| 4,147,157 | 4/1979 | Zakhariya | 126/586 |
| 4,270,350 | 6/1981 | Chevalier | 60/671 |
| 4,423,599 | 1/1984 | Veale | 60/641.8 |
| 4,628,892 | 12/1986 | Pierce | 60/641.8 |
| 5,444,972 | 8/1995 | Moore | 60/39.182 |
| 5,660,165 | 8/1997 | Lannes | 126/641 |
| 5,685,152 | 11/1997 | Sterling | 60/641.8 |

FOREIGN PATENT DOCUMENTS 8803091   7/1990   Netherlands ............. 126/609

Primary Examiner—Ira S. Lazarus
Assistant Examiner—Ljiljana V. Ciric
Attorney, Agent, or Firm—Michael I. Kroll

[57] ABSTRACT

A solar powered electrical generating system (10) comprising a continuous hydraulic circuit (12) carrying a liquid (14) therethrough. A boiler (16) is fluidly connected to a first side of the continuous hydraulic circuit (12). A facility (18) is for heating the liquid (14) within the boiler (16). A condenser (20) is fluidly connected to a second side of the continuous hydraulic circuit (12). A facility (22) is for cooling the liquid (14) within the condenser (20). A hydraulic motor (24) is fluidly connected into a flow line of the continuous hydraulic circuit (12) between a lower exit port of the boiler (16) and an upper entrance port of the condenser (20). The liquid (14) when heated in the boiler (16) will flow from the boiler (16) to the condenser (20) to operate the hydraulic motor (24). A recirculation pump (26) is fluidly connected into a recirculation line of the continuous hydraulic circuit (12) between a lower exit port of the condenser (20) and an entrance port of the boiler (16). The liquid (16) when cooled in the condenser (20) will flow back to the boiler (16). A check valve (28) is in the recirculation line of the continuous hydraulic circuit (12). An electric generator (30) is provided. A structure (32) is for coupling the electric generator (30) to the hydraulic motor (24), so that the hydraulic motor (24) will drive the electric generator (30) to produce electricity.

4 Claims, 3 Drawing Sheets

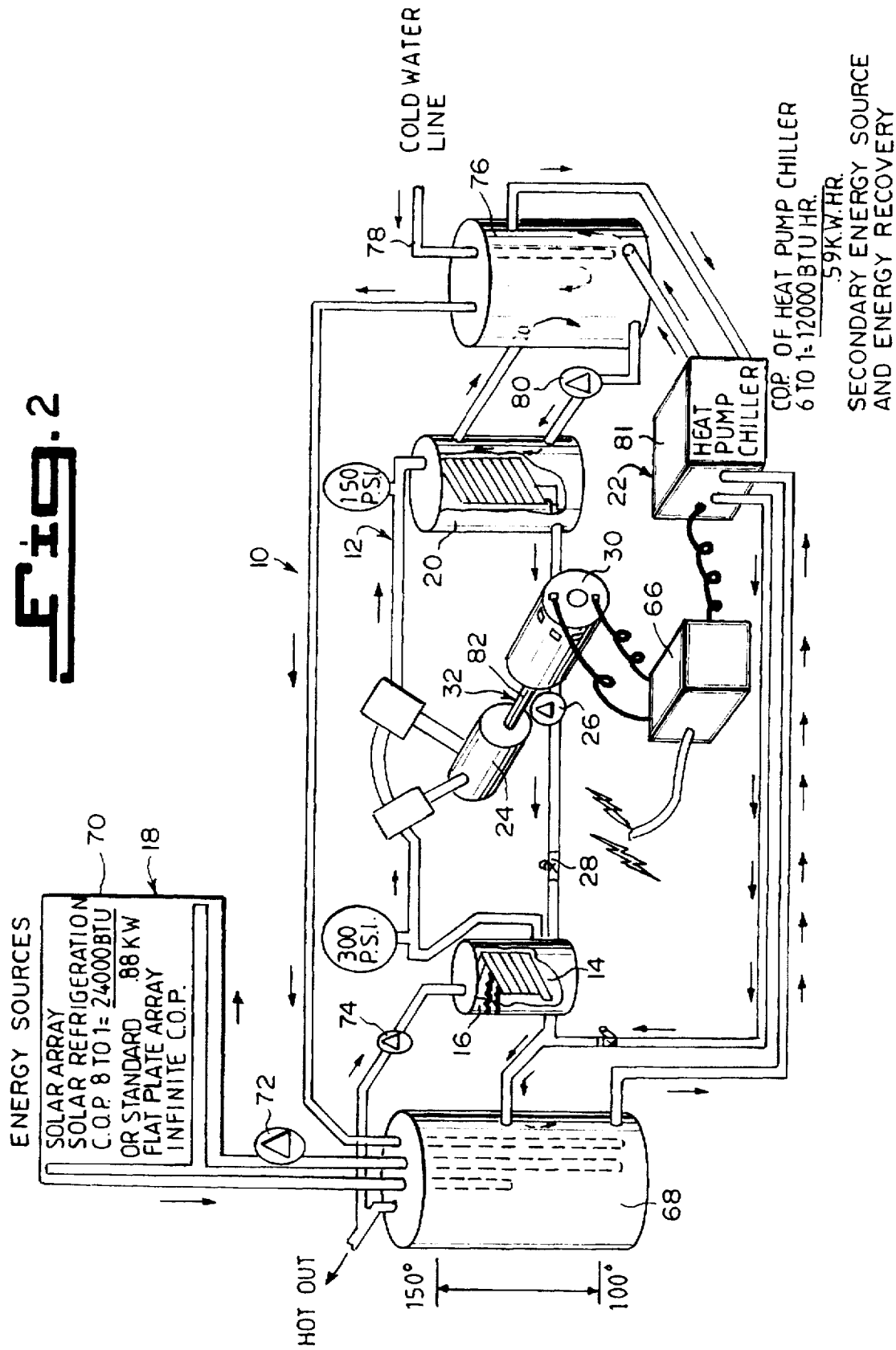

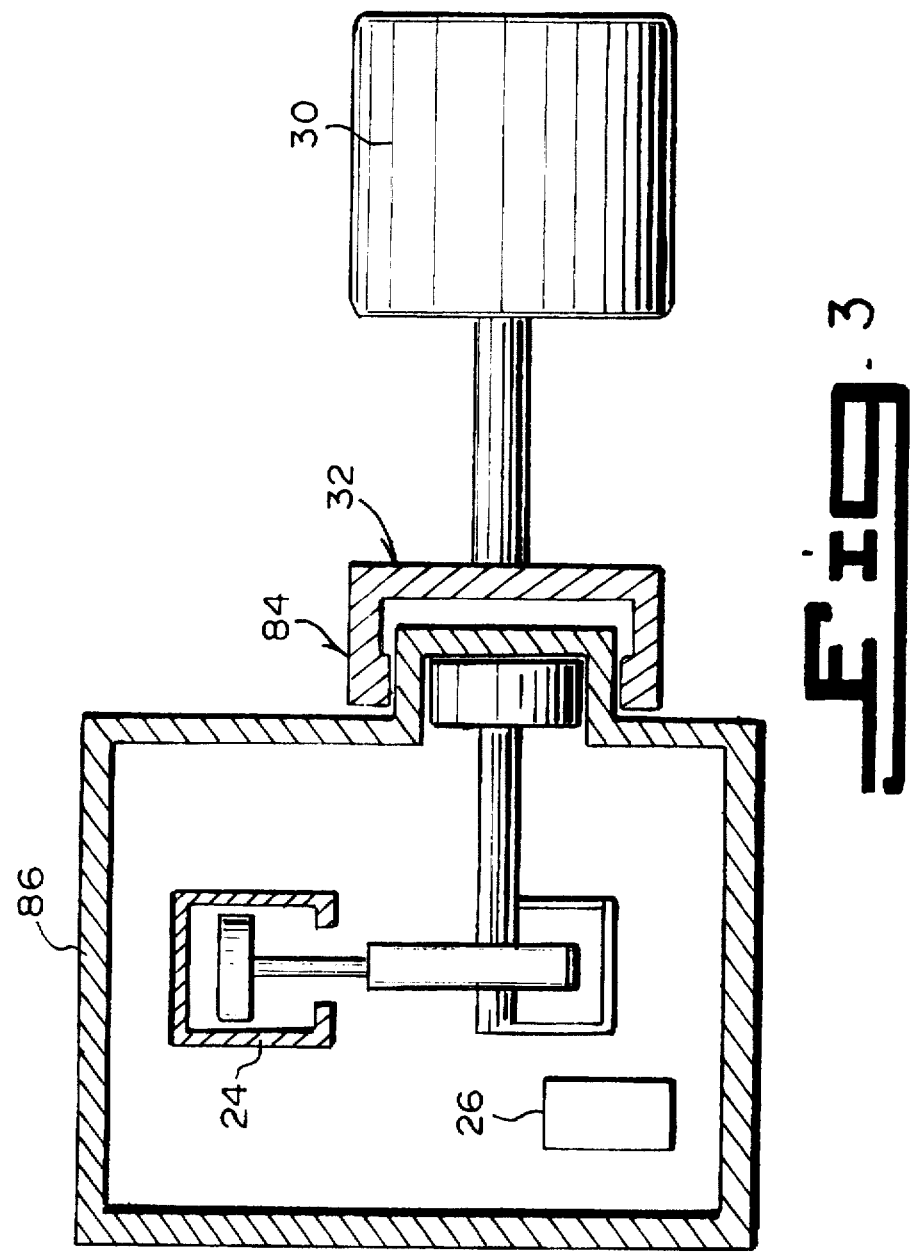

SOLAR POWERED ELECTRICAL GENERATING SYSTEM

BACKGROUND OF THE INVENTION

Field of the Invention

The instant invention relates generally to solar energy collectors and more specifically it relates to a solar powered electrical generating system.

All life on Earth depends on energy from the sun. Solar energy is the source of energy for photosynthesis. It provides the warmth necessary for plants and animals to survive. The heat from the sun causes water on the Earth's surface to evaporate and form clouds that eventually provide fresh rainwater.

Solar energy is the result of thermonuclear fusion reactions deep within the sun. These reactions produce so much energy that they keep the surface temperature of the sun at about 10,300° F. (5,7000° C.). Even though solar energy is the largest source of energy received by the Earth, its intensity at the Earth's surface is actually very low due to the large distance between the Earth and the sun and the fact that the Earth's atmosphere absorbs and scatters some of the radiation. Even on a clear day with the sun directly overhead, the energy that reaches the Earth's surface is reduced about 30 percent by the atmosphere. When the sun is near the horizon and the sky is overcast, the solar energy at ground level can be negligible. It also varies from one point to another on the Earth's surface.

Nevertheless, in the 20th century, the sun's energy has become an increasingly attractive source for small amounts of direct power to meet human needs. A number of devices for collecting solar energy and converting it into electricity have been developed, and solar energy is used in a variety of ways. Solar energy is used to heat houses, and in many countries specially designed solar ovens are used for cooking. The sun also supplies energy to electric generators that provide power for weather and communications satellites and for radio and television equipment.

Description of the Prior Art

Numerous solar energy collectors have been provided in prior art that are adapted to capture the suns radiation at the surface of the Earth, so as to gather enough energy for use by humans. While these units may be suitable for the particular purpose to which they address, they would not be as suitable for the purposes of the present invention as heretofore described.

Because the intensity of the sun's radiation at the surface of the Earth is so low, collectors designed to capture solar energy must be large. In the sunniest parts of the continental United States, for example, in order for a collector to gather enough energy to serve one person for one day, the area of the collector's surface must be about 430 square feet (40 square meters). The actual energy that can be used depends on the efficiency of the collector and of the device that converts the radiation into usable energy.

The most common is a flat-plate collector that consists of a dark metal plate, covered with one or two sheets of glass, that absorbs heat. The heat is transferred to air or water, called carrier fluids, that flows past the back of the plate. This heat may be used directly or it may be transferred to another medium. Flat-plate collectors are used for home and hot-water heating. Flat-plate collectors typically heat carrier fluids to temperatures ranging from 150 to 200° F. (66 to 93° C.). The efficiency of such collectors varies from 20 to 80 percent.

When higher temperatures are required, a concentrating collector is used. These collectors reflect and concentrate sunlight from a wide area. One such device, called a solar furnace, was installed in the Pyrenees in France and has several acres of mirrors focused on a single target. The energy concentrated at the target is 3,000 times that received by any single mirror, and the unit produces temperatures of up to 3,630° F. (2,000° C.). Another structure, the so-called "power tower" plat near Barstow, CA, generates 10,000 kilowatts of electricity. Here, the furnace acts as a boiler and generates steam for a steam turbine-electric generator power plant.

In sophisticated concentrating collectors such as the California tower, each mirror is rotated by a heliostat that directs the sun's rays from the mirror to the target. Positioning motors, drives, and controllers make such systems expensive. Less costly collectors can produce temperatures lower than those of more advanced concentrating collectors, but higher than those of flat-plate collectors. For example, parabolic reflectors that concentrate sunlight on black pipes can produce fluid temperatures of about 400 to 550° F. (200 to 290° C.) and can concentrate the solar energy up to 50 times its original strength.

In the concentrating collectors described above, electricity is generated from solar energy by a steam power plant in which the boiler gets its energy by absorbing concentrated solar radiation rather than by burning a fossil fuel. There is, however, a means of converting solar energy directly into electricity by using photoelectric cells, or solar cells. These cells produce an electrical voltage as long as light shines on them. Although photoelectric cells are very reliable, their efficiency is low, less than 11 percent. Consequently, they must be combined into large arrays to generate sufficient power for practical applications. Large photoelectric panels have been used to power orbiting satellites, but on the ground the use of photoelectric cells is limited primarily to providing electricity for watches, calculators and cameras.

Solar-energy collection is variable and does not necessarily match the changing demand for energy. Consequently, some form of energy storage is necessary to save energy for use during times when there is little or no sunlight. The electrical power from photoelectric cells can be stored in electric storage batteries. In systems that use the collected energy to heat a fluid, the fluid may be directly stored in an insulated tank or the energy may be transferred to another storage medium, such as a bed of rocks.

The potential for solar energy is enormous. Each day the Earth receives in the form of solar energy about 200,000 times the total world electrical-generating capacity. Although the energy itself is free, the high cost of collection, conversion, and storage has limited the exploitation of solar energy. Nevertheless, researchers are experimenting with solar power in a variety of contexts.

One scheme that has been proposed for the future is the use of satellite solar-power stations to supply power to Earth. In this scheme, a satellite equipped with large solar panels would collect solar energy constantly, bypassing atmospheric interference. The electricity would be converted to microwaves and then beamed to Earth, where the microwave energy would be converted back to electricity for distribution.

SUMMARY OF THE INVENTION

A primary object of the present invention is to provide a solar powered electrical generating system that will overcome the shortcomings of the prior art devices.

Another object is to provide a solar powered electrical generating system that creates electricity using the sun as the source of energy in which infrared energy is turned into kinetic energy, which then operates a generator that produces electricity.

An additional object is to provide a solar powered electrical generating system that is cost effective and produces excess free electricity.

A further object is to provide a solar powered electrical generating system that is simple and easy to use.

A still further object is to provide a solar powered electrical generating system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is a diagrammatic view of a second embodiment of the instant invention.

FIG. 3 is a diagrammatic view partly in cross section, showing an external generator outside the hermetically sealed housing coupled to the hydraulic motor via a magnetic drive shaft assembly.

Similar reference characters denote corresponding features consistently throughout the attached drawings.

DETAILED DESCRIPTION OF THE PREFERRED EMBODIMENTS

Figure 1:
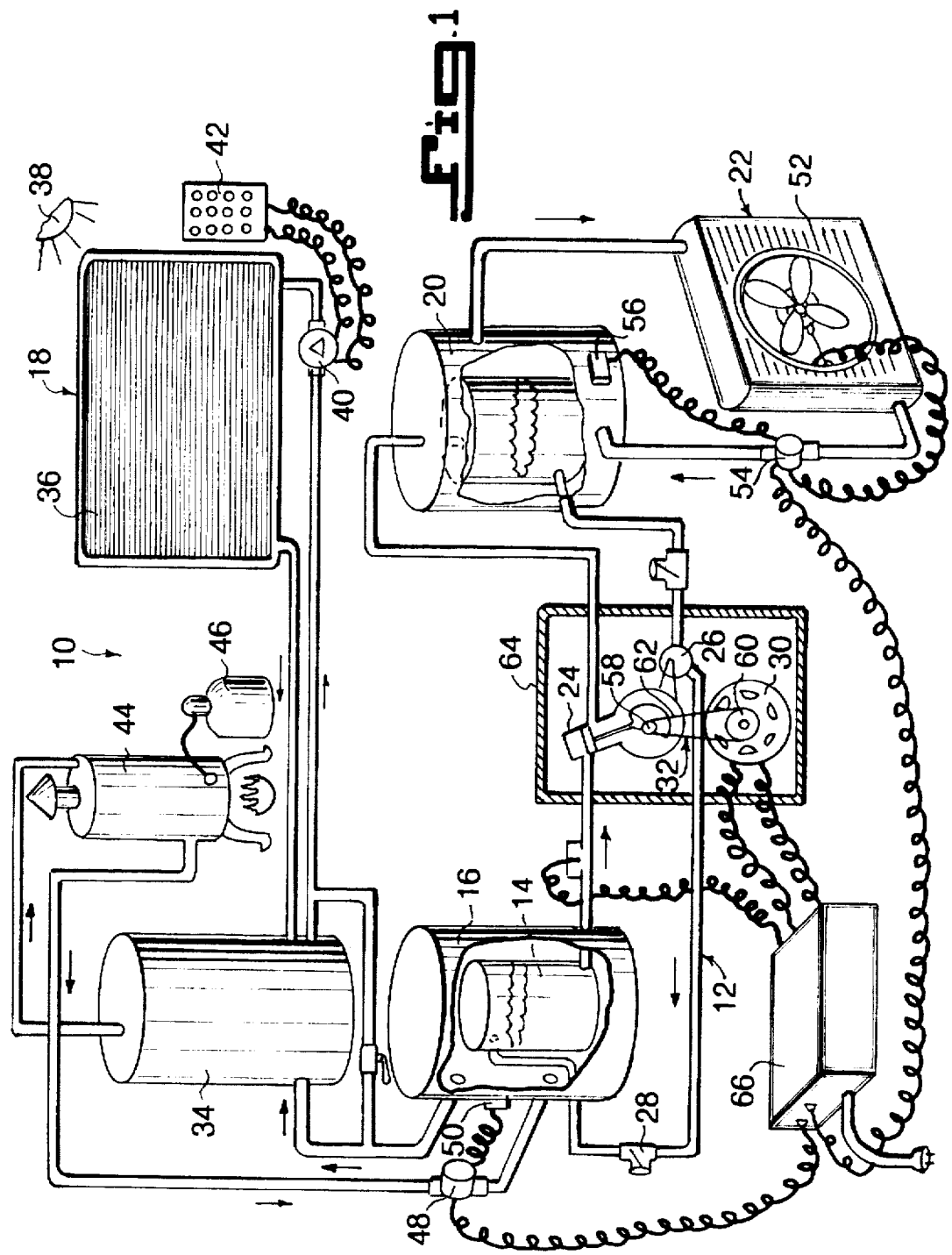
FIG. 1 is a diagrammatic view of a first embodiment of the instant invention.

Turning now descriptively to the drawings, in which similar reference characters denote similar elements throughout the several views, FIGS. 1 and 2 illustrate a solar powered electrical generating system 10 comprising a continuous hydraulic circuit 12 carrying a liquid 14 therethrough. A boiler 16 is fluidly connected to a first side of the continuous hydraulic circuit 12. A facility 18 is for heating the liquid 14 within the boiler 16. A condenser 20 is fluidly connected to a second side of the continuous hydraulic circuit 12. A facility 22 is for cooling the liquid 14 within the condenser 20. A hydraulic motor 24 is fluidly connected into a flow line of the continuous hydraulic circuit 12 between a lower exit port of the boiler 16 and an upper entrance port of the condenser 20. The liquid 14 when heated in the boiler 16 will flow from the boiler 16 to the condenser 20, to operate the hydraulic motor 24.

A recirculation pump 26 is fluidly connected into a recirculation line of the continuous hydraulic circuit 12 between a lower exit port of the condenser 20 and an entrance port of the boiler 16. The liquid 14 when cooled in the condenser 20 will flow back to the boiler 16. A check valve 28 is in the recirculation line of the continuous hydraulic circuit 12. An electric generator 30 is provided. A structure 32 is for coupling the electric generator 30 to the hydraulic motor 24, so that the hydraulic motor 24 will drive the electric generator 30 to produce electricity. The liquid 14 is a halogenated hydrocarbon mixture.

The heating facility 18, as shown in FIG. 1, includes an insulated heated water storage tank 34 fluidly connected to the boiler 16. A flat plate solar collector panel 36 which collects heat from the sun 38 is fluidly connected to the heated water storage tank 34. A circulation pump 40 is fluidly connected between the heated water storage tank 34 and the flat plate solar collector panel 36. A photocell 42 powers the circulation pump 40.

The heating facility 18 in FIG. 1 contains a back up gas hot water heater 44, fluidly connected between the heated water storage tank 34 and the boiler 16. The gas hot water heater 44 will provide energy if the sun 38 does not shine. A propane/natural gas tank 46 powers the gas hot water heater 44. A small water circulation pump 48 is fluidly connected between the boiler 16 and the gas hot water heater 44. An aquastat thermostat 50 is on the boiler 16 and is electrically connected to the small water circulation pump 48. The aquastat thermostat 50 will operate the small water circulation pump 48, when the temperature drops in the boiler 16 a predetermined amount.

The cooling facility 22, as shown in FIG. 1, consists of a water to air heat exchanger 52 fluidly connected to the condenser 20. A small water circulation pump 54 is fluidly connected between the condenser 20 and the water to air heat exchanger 52. An aquastat thermostat 56 is on the condenser 20 and is electrically connected to the small water circulation pump 54. The aquastat thermostat 56 will operate the small water circulation pump 54, when the temperature rises in the condenser 20 a predetermined amount.

The coupling structure 32 in FIG. 1, includes a drive pulley 58 on the hydraulic motor 24. A driven pulley 60 is on the generator 30. A belt 62 extends between the drive pulley 58 and the driven pulley 60. A hermetically sealed housing 64 retains the hydraulic motor 24, the recirculation pump 26 and the generator 30 therein.

An inverter 66, as shown in FIGS. 1 and 2, is electrically connected to the electric generator 30. The inverter 66 will convert DC current from the electric generator 30 to AC current.

The heating facility 18 in FIG. 2, contains an insulated heated water storage tank 68 fluidly connected to the boiler 16. A solar array 70 which collects heat from the sun 38 is fluidly connected to the heated water storage tank 68. A first circulation pump 72 is fluidly connected between the heated water storage tank 68 and the solar array 70. A second circulation pump 74 is fluidly connected between the heated water storage tank 68 and the boiler 16.

The cooling facility 22 in FIG. 2, consists of a cold water storage tank 76 fluidly connected between the condenser 20, the heated water storage tank 68 and a cold water line 78. A circulation pump 80 is fluidly connected between the condenser 20 and the cold water storage tank 76. A heat pump chiller 81 is fluidly connected between the cold water storage tank 76 and the hot water storage tank 68. The heat pump chiller 81 can recycle waste heat from the cold water storage tank 76 to the heated water storage tank 68. The coupling structure 32 in FIG. 2, includes a drive shaft 82 on the hydraulic motor 24 directly connected to the generator 30.

The coupling structure 32 in FIG. 3, consists of a magnetic drive shaft assembly 84 between the hydraulic motor 24 and the generator 30. A non-ferrous hermetically sealed housing 86 is provided in FIG. 3, to retain the hydraulic motor 24 and the recirculation pump 26 therein. The generator 30 is externally located outside of the non-ferrous hermetically sealed housing 86.

ENERGY CALCULATIONS EXAMPLE 1,000,000 BTUs of free heat comes from the sun 38 daily. The hydraulic motor 24 and generator 30 based on an efficiency of 35% will convert 35% of that heat to electricity. This results in 350,000 BTUs being converted to electrical energy.

350,000 BTUs
3,413 (1 kw/hr=3,413 BTUs) resulting in 102
Kilowatts daily.

The two small circulation pumps 48 and 54 and a fan in the water to air heat exchanger 52, uses no more than 300 watts total per hour and runs only about 50% of the time. 300×12=3600 watts or 3.6 kw/hr per day is consumed by the system 10 in order for it to run. 102 kw/hr minus 3.6 kwhr leaves 98.4 kw/hr available for use daily.

LIST OF REFERENCE NUMBERS 10 solar powered electrical generating system
12 continuous hydraulic circuit of 10
14 liquid in 12
16 boiler of 10
18 heating facility of 10
20 condenser of 10
22 cooling facility of 10
24 hydraulic motor of 10
26 recirculation pump of 10
28 check valve of 10
30 electric generator of 10
32 coupling structure of 10
34 insulated heated water storage tank of 18
36 flat plate solar collector panel of 18
38 the sun
40 circulation pump of 18
42 photocell of 18
44 gas hot water heater of 18
46 propane/natural gas tank for 44
48 small water circulation pump of 18
50 aquastat thermostat of 18
52 water to air heat exchanger of 22
54 small water circulation pump of 22
56 aquastat thermostat of 22
58 drive pulley of 32 on 24
60 driven pulley of 32 on 30
62 belt of 32 between 58 and 60
64 hermetically sealed housing for 24, 26 and 30
66 inverter of 10
68 insulated heated water storage tank of 18
70 solar array of 18
72 first circulation pump of 18
74 second circulation pump of 18
76 cold water storage tank of 22
78 cold water line into 76
80 circulation pump of 22
81 heat pump chiller of 22
82 drive shaft for 32
84 magnetic drive shaft assembly for 32
86 non-ferrous hermetically sealed housing for 24 and 26

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A solar powered electrical generating system comprising:
   a) a continuous hydraulic circuit carrying a halogenated hydrocarbon liquid therethrough;
   b) a boiler fluidly connected to a first side of said continuous hydraulic circuit;
   c) means for heating said liquid within said boiler comprising an heated water storage tank fluidly connected to said boiler, a flat plate solar collector panel collecting heat from the sun fluidly connected to deliver solar heated water to said heated water storage tank, first pump means for circulating water between said collector panel, said storage tank, and said boiler, and a photocell to power said first pump means;
   d) a condenser fluidly connected to a second side of said continuous hydraulic circuit;
   e) means for cooling said liquid within said condenser comprising a water to air heat exchanger fluidly connected to said condenser, second pump means for circulating water between said condenser and said water to air heat exchanger, and aguastat thermostat on said condenser electrically connected to said second pump means for operating said second pump means when the temperature rises in said condenser by a predetermined amount;
   f) a hydraulic motor fluidly connected into a flow line of said continuous hydraulic circuit between a lower exit port of said boiler and an upper entrance port of said condenser, so that said liquid when heated in said boiler will flow from said boiler to said condenser to operate said hydraulic motor;
   g) a recirculation pump fluidly connected into a recirculation line of said continuous hydraulic circuit between a lower exit port of said condenser and an entrance port of said boiler, so that said liquid when cooled in said condenser will flow back to said boiler;
   h) a check valve in said recirculation line of said continuous hydraulic circuit;
   i) an electric generator;
   j) means for coupling said electric generator to said hydraulic motor, so that said hydraulic motor will drive said electric generator to produce electricity;
   k) a back up hot water heater fluidly connected between said heated water storage tank and said boiler, hydrocarbon fuel means to power said hot water heater, third pump means for circulating water between said boiler and said back up hot water heater, and an aquastat thermostat on said boiler electrically connected to said third pump means to operate said small water circulation pump when the temperature drops in said boiler by a predetermined amount.

2. A solar powered electrical generating system as recited in claim 1, wherein said coupling means includes:

a) a drive pulley on said hydraulic motor;

b) a driven pulley on said generator; and c) a belt extending between said drive pulley and said driven pulley.

3. A solar powered electrical generating system as recited in claim 2, further including a hermetically sealed housing to retain said hydraulic motor, said recirculation pump and said generator therein.

4. A solar powered electrical generating system as recited in claim 1, further including an inverter electrically connected to said electric generator, whereby said inverter will convert DC current from said electric generator to AC current.

\* \* \* \* \*